United States Patent [19]
Vincent et al.

[11] Patent Number: 5,396,675
[45] Date of Patent: Mar. 14, 1995

[54] METHOD OF MANUFACTURING A MIDSOLE FOR A SHOE AND CONSTRUCTION THEREFOR

[75] Inventors: Stephen M. Vincent; David L. Vattes, both of Beaverton, Oreg.

[73] Assignee: Nike, Inc., Beaverton, Oreg.

[21] Appl. No.: 710,381

[22] Filed: Jun. 10, 1991

[51] Int. Cl.$^6$ ............................................. A43B 13/12
[52] U.S. Cl. .................................... 12/142 P; 36/114; 36/30 R; 264/267
[58] Field of Search ............... 36/30 R, 30 A, 31, 68, 36/37, 69, 32 R, 28, 114; 12/146 B, 142 P, 146 BR; 264/46.4, 46.6, 259, 267, 244

[56] References Cited

U.S. PATENT DOCUMENTS

| | | |
|---|---|---|
| 73,924 | 1/1868 | Pickett . |
| 161,994 | 4/1875 | Thackerey . |
| 711,309 | 10/1902 | Hartrick . |
| 1,607,896 | 11/1926 | Kelly . |
| 2,156,532 | 5/1939 | Greider . |
| 2,230,504 | 2/1941 | Rudner . |
| 2,660,743 | 12/1953 | Meltzer ................................ 36/68 X |
| 3,021,572 | 2/1962 | Smith, Jr. ...................... 264/244 X |
| 3,165,841 | 1/1965 | Rollman . |
| 3,178,496 | 4/1965 | Ferreira ................................ 264/244 |
| 3,436,781 | 4/1969 | Becka et al. ................... 264/244 X |
| 3,439,384 | 4/1969 | Crossen et al. ................ 264/244 X |
| 3,463,849 | 8/1969 | Winkler .............................. 264/244 |
| 3,504,079 | 3/1970 | Hall ................................... 264/244 X |
| 3,670,070 | 6/1972 | Appleton ....................... 264/46.4 X |
| 3,821,135 | 6/1974 | King . |
| 3,905,376 | 9/1975 | Johnson et al. ........................ 36/154 |
| 3,984,925 | 10/1976 | Famolare, Jr. . |
| 4,043,058 | 8/1977 | Hollister et al. . |
| 4,050,167 | 9/1977 | Senter .................................. 36/32 R |
| 4,069,601 | 1/1978 | Robbins et al. . |
| 4,128,950 | 12/1978 | Bowerman et al. . |
| 4,219,945 | 9/1980 | Rudy ....................................... 36/29 |
| 4,228,600 | 10/1980 | Krug et al. . |
| 4,229,889 | 10/1980 | Petrosky ............................. 36/43 X |
| 4,302,892 | 12/1981 | Adamik . |
| 4,316,332 | 2/1982 | Giese et al. . |
| 4,316,335 | 2/1982 | Giese et al. . |
| 4,346,525 | 8/1982 | Larsen et al. ............................ 36/69 |
| 4,364,189 | 12/1982 | Bates . |
| 4,490,928 | 1/1985 | Kawashima ....................... 36/31 X |
| 4,506,460 | 3/1985 | Rudy ..................................... 36/69 X |
| 4,551,930 | 11/1985 | Graham et al. . |
| 4,561,140 | 12/1985 | Graham et al. . |
| 4,571,857 | 2/1986 | Castellanos ....................... 36/154 X |
| 4,581,187 | 4/1986 | Sullivan et al. ..................... 264/46.4 |
| 4,627,178 | 12/1986 | Sullivan et al. ................... 36/154 X |
| 4,654,983 | 4/1987 | Graham et al. . |
| 4,674,204 | 6/1987 | Sullivan et al. ................ 264/46.4 X |
| 4,730,402 | 3/1988 | Norton et al. . |
| 4,731,939 | 3/1988 | Parracho et al. . |
| 4,766,679 | 8/1988 | Bender ................................ 36/68 X |
| 4,854,055 | 8/1989 | Sugiyama et al. ................. 36/68 X |
| 4,864,736 | 9/1989 | Bierk ................................... 36/11.5 |
| 4,864,738 | 9/1989 | Horovitz ................................. 36/29 |
| 4,866,861 | 9/1989 | Noone ................................. 36/69 X |
| 4,876,053 | 10/1989 | Norton et al. . |
| 4,947,560 | 8/1990 | Fuerst et al. ........................... 36/88 |
| 4,972,611 | 11/1990 | Swartz et al. .......................... 36/28 |
| 5,012,597 | 5/1991 | Thomasson ......................... 36/59 C |
| 5,048,203 | 9/1991 | Kling .............................. 36/59 C X |

FOREIGN PATENT DOCUMENTS

| | | |
|---|---|---|
| 79200549-A | 3/1991 | China . |
| 0146208 | 6/1985 | European Pat. Off. ................ 36/69 |
| 2488788 | 2/1982 | France .................................... 36/114 |
| 2007081-A | 5/1979 | United Kingdom . |
| 2136670 | 9/1984 | United Kingdom ................ 36/114 |
| 2171890 | 9/1986 | United Kingdom ................ 36/114 |

Primary Examiner—Paul T. Sewell
Assistant Examiner—Ted Kavanaugh
Attorney, Agent, or Firm—Banner, Birch, McKie & Beckett

[57] ABSTRACT

The present invention is directed to a method of manufacturing a midsole for a shoe and the structure of the resulting midsole. The midsole includes a core of a first plastic material and a peripheral wrap of a second plastic material. The wrap has an outer peripheral surface comprising at least a portion of an outer peripheral surface of the midsole. The method includes the steps of molding a peripheral wrap from a sheet stock of the first plastic material by applying compressive forces on the sheet stock in a direction which is substantially perpendicular with the outer surface of the sheet stock, placing the wrap around the inner peripheral surface of a mold which approximates the shape of the midsole, and pouring the first plastic material in the mold.

3 Claims, 6 Drawing Sheets

METHOD OF MANUFACTURING A MIDSOLE FOR A SHOE AND CONSTRUCTION THEREFOR

TECHNICAL FIELD

The present invention relates to a method of manufacturing a midsole for a shoe and the structure of the resulting midsole. More particularly, the present invention relates to a method of manufacturing a midsole which provides more precise ornamental details on the side of the midsole.

BACKGROUND OF THE INVENTION

When designing a midsole of a shoe, various considerations must be taken into account. Unfortunately, some of the considerations work to the disadvantage of others. For example, depending on the application, a shoe can be designed to dissipate a predetermined amount of shock by choosing the appropriate hardness of the material within the midsole. However, the midsole should not be so soft that it sacrifices lateral stability. When manufacturing midsoles according to the methods known in the prior art, sufficient stability and shock absorption can usually be achieved through a compromise; however, the ornamental cosmetic features on the exterior of the midsole are consequently sacrificed. This is due to the way that midsoles are conventionally manufactured.

In particular, prior methods of manufacturing midsoles first require the production of a sheet stock of plastic material such as an open cell foam or a closed cell foam. These plastic sheet stock materials generally consist of well known open cell foam materials such as crepe rubber or polyurethane (PU). Alternatively, well known closed cell foam materials including ethylene vinyl acetate (EVA) could be used. These open and closed cell foam materials are discussed in more detail in U.S. Pat. No. 4,043,058 issued to Hollister et al. and U.S. Pat. No. 4,128,950 issued to Bowerman et al., both of which are hereby incorporated by reference.

Hollister et al. '058 and Bowerman et al. '950 disclose a midsole construction whose component parts are stockfit. In other words, the component pieces comprising the midsole are molded from a closed cell foam material such as EVA or polyisoprene microcellular rubber, die out from the closed cell foam materials, and cemented together to form a unitary midsole. Giese et al., U.S. Pat. No. 4,316,332 and Adamik et al., U.S. Pat. No. 4,302,892 also disclose midsoles whose components are cemented together in a stockfitting process. Giese et al., U.S. Pat. No. 4,316,332 and Adamik et al., U.S. Pat. No. 4,302,892 are hereby incorporated by reference. Also incorporated by reference are U.S. Pat. No. 3,821,135 to King, U.S. Pat. No. 4,364,189 to Bates and U.S. Pat. No. 4,228,600 to Krug et al. which disclose midsoles manufactured from more than one material.

Once a sheet stock of the plastic material is manufactured, it is cut into a plurality of pieces which approximate the shape of a midsole. These midsole pieces are known as preforms. The preforms are placed within a mold half such as that shown in FIG. 2. The mold half 10 has a cut-out portion 12 of the same shape of the completed midsole. Another unshown mold half applies vertically directed pressure with respect to the top surface 14 of the mold half 10. The arrow 16 shows the general direction of pressure applied to the preform as it sits in cut-out portion 12. Consequently, the preform is compressed within the mold half 10. In this compression molding process, the preform may have a compression set within the range of about 12% to 15%. Alternatively, the preform may be, for example, 105% of the final product formed by the compression molding.

The compression molding relies primarily on heat and pressure to reduce the size of the original cell structure of the fabricated component by minimizing the amount of air and/or gas within the individual cells. The compression, which is similar to preshriking or sanforizing, maintains the life of the material such as EVA over a period of time longer than non-compressed EVA preforms. This molding process is described in more detail in U.S. Pat. Nos. 4,730,402 and 4,876,053, both of which are issued to Norton et al. and both of which are hereby incorporated by reference. Furthermore, the process of molding EVA with polyurethane is also disclosed in U.S. Pat. Nos. 4,551,930, 4,561,140, and 4,654,983, all issued to Graham et al. and all of which are hereby incorporated by reference.

While there are advantages gained by compression molding a plastic material, e.g. extending the life of the material, there are attendant disadvantages of such compressive forces. In particular, the compressive forces are aligned in the direction of arrow 16 which is substantially parallel to the inner surface 18 of the sidewall of the mold 10. Consequently, the outer surface of the perform receives very little lateral compressive forces. Instead, the outer surface of the preform aligned along the inner surface 18 of the mold 10 receives mostly vertically directed compressive forces.

Consequently, it is very difficult to obtain ornamental details on the sidewalls of the midsole which have a high resolution. Instead, only nominal details can be formed on the side of a preform, because the compressive forces imparted on the preform are not aligned in the proper direction. Therefore, in order to develop fine details on the outer surface of the midsole, it is necessary to apply the compressive forces in a direction which is aligned substantially perpendicular with respect to the outer surface of the midsole.

SUMMARY OF THE INVENTION

It is an object of the present invention to provide a midsole with various ornamental design features on the outer surface thereof. Moreover, it is an object of the present invention to provide a midsole having an element along the outer surface thereof which has varying densities and hardnesses along the length thereof. Still further, it is an object of the present invention to provide a manufacturing process which can produce an element having detailed ornamental features for placement on an outer surface of a midsole.

The present invention is directed to a method of manufacturing a midsole for a shoe and the structure of the resulting midsole. The preferred midsole includes a core portion of a first plastic material and a peripheral wrap of a second plastic material. The wrap has an outer peripheral surface comprising at least a portion of an outer peripheral surface of the midsole. A preferred method can be characterized by several steps which include producing a sheet stock of the second plastic material, molding the peripheral wrap in the sheet stock by applying compressive pressure on the sheet stock in a direction which is substantially perpendicular with the outer surface of the sheet stock, die cutting the wrap from the sheet stock, placing the wrap around the inner peripheral surface of a mold which approximates the shape of the midsole, and pouring the first plastic material into the mold. Preferably, the first plastic material is allowed to set in situ for a predetermined amount of time whereupon the midsole is completely formed.

A preferred method of manufacturing the midsole affords high resolution of the details on the outer surface of the midsole due to the orientation of the compressive forces which have been applied during the manufacturing process. A preferred midsole has at least a portion of its outer surface comprising a peripheral wrap. When the wrap is placed on the outer surface of the midsole, the compressive forces which have been applied to the wrap were all aligned in a direction which is substantially perpendicular with respect to the outer peripheral surface of the midsole. Consequently, since the orientation of the compressive forces have been changed with respect to prior midsole manufacturing processes, much sharper design features can be obtained. Moreover, the design features also provide different densities and hardnesses along the length of the wrap. This allows for fine tuning the lateral stability characteristics along the outer periphery of the midsole.

Also, a preferred embodiment provides a midsole for an athletic shoe having a core portion of open cell foam material at least partially surrounded by a wrap portion of closed cell foam material. The open cell foam material has a first hardness and the closed cell foam material has a second hardness which could be either greater than, equal to, or less than the first hardness. In the construction of the preferred embodiment, the wrap has an outer peripheral surface forming at least a portion of the outer surface of the midsole.

These and other features and advantages of the present invention will become apparent from the following detailed description, wherein reference is made to the figures in the accompanying drawings.

DETAILED DESCRIPTION OF THE PREFERRED EMBODIMENTS

Figure 1:
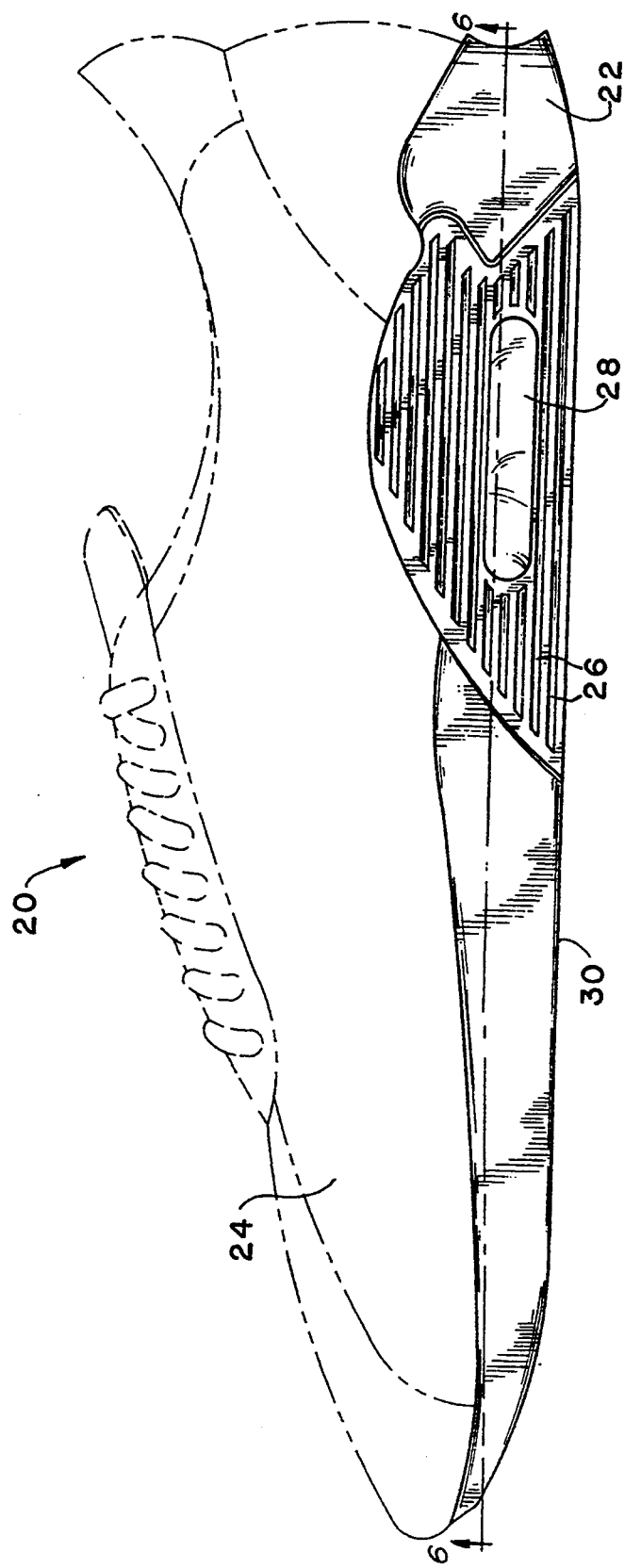
FIG. 1 is an elevational view of a side of a shoe showing a midsole manufactured in accordance with the preferred method.
Figure 2:
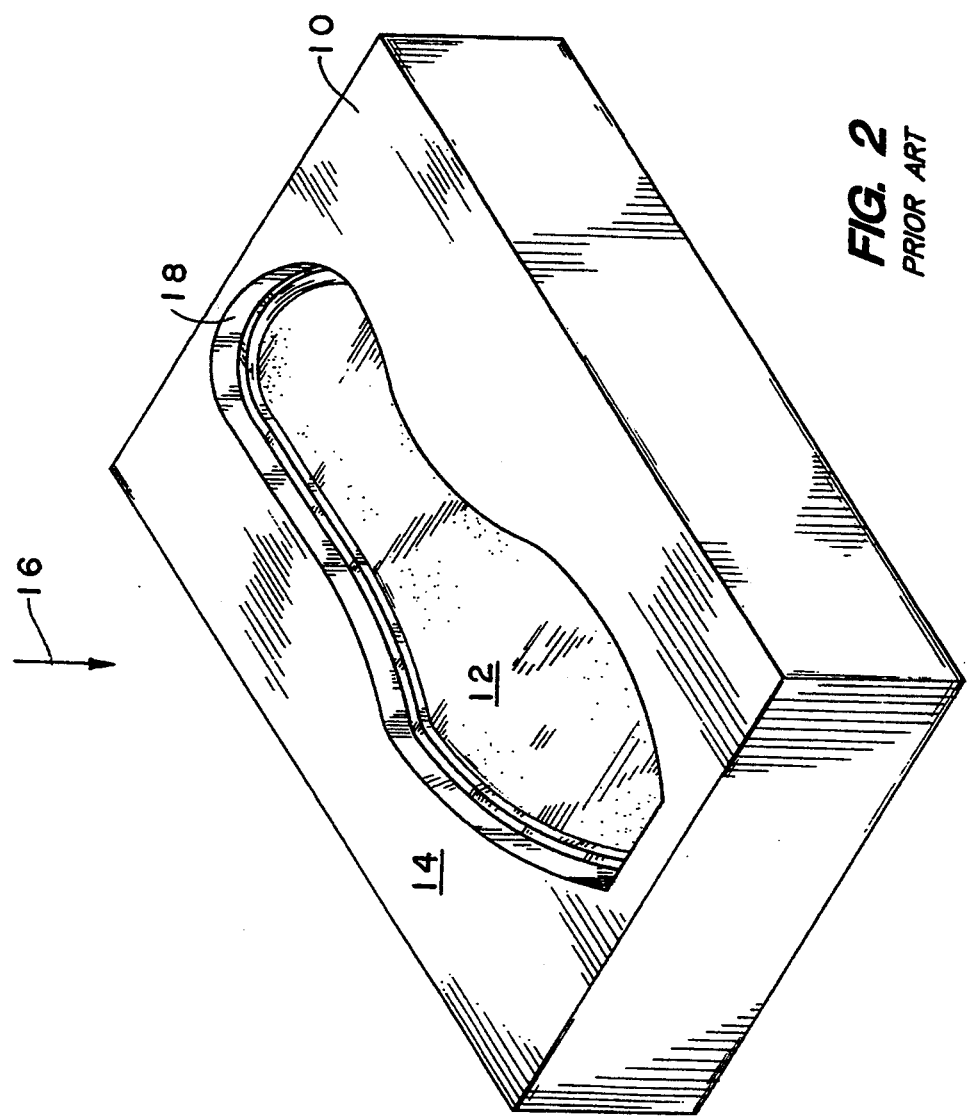
FIG. 2 is a perspective view of a mold used to manufacture a midsole according to the prior art.

Referring to the drawings, wherein like numerals indicate like elements, there is shown in FIG. 1 an athletic shoe 20 with a midsole 22 manufactured according to the present invention. An upper 24 shown in phantom is secured to the midsole 22. The midsole 22 can have a variety of ornamental features on the outer periphery thereof. For example, the midsole 22 can be molded to have a plurality of horizontal lines 26 surrounding an oval window element 28. An outsole is secured to the bottom surface 30 of the midsole 22, and typically has a tread configuration designed for a particular athletic application.

Figure 6:
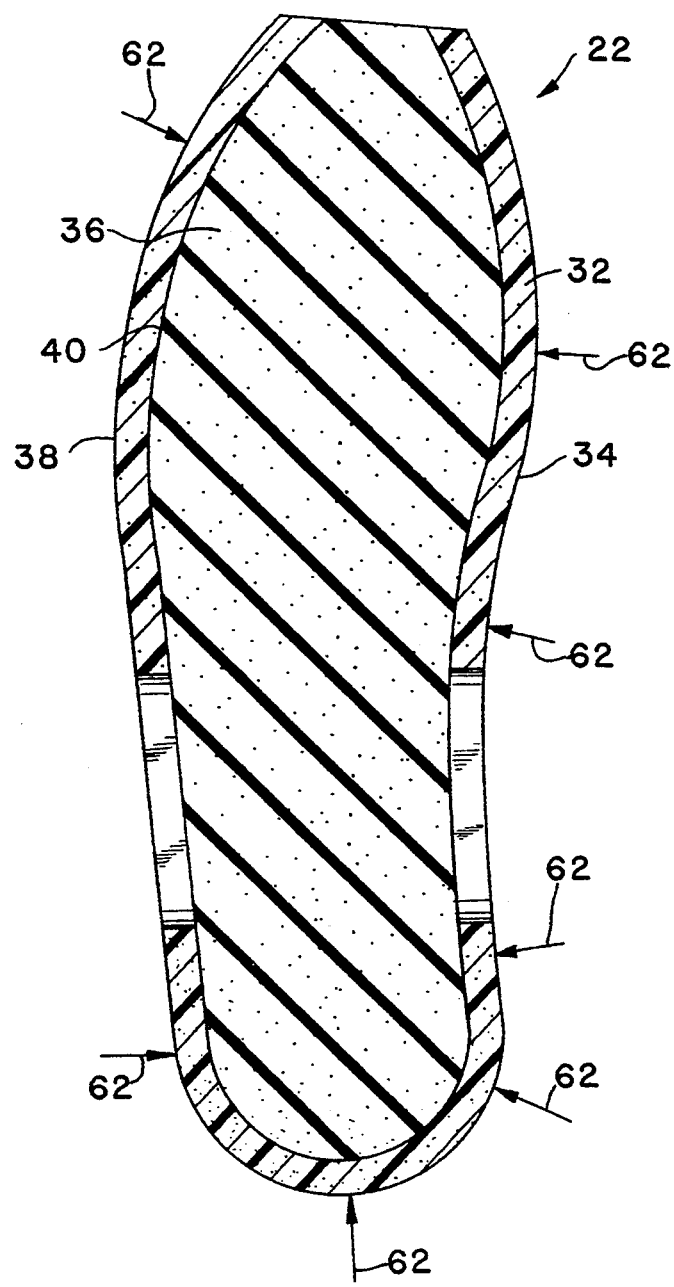
FIG. 6 is a cross section taken along line 6—6 in FIG. 1.

With reference to FIG. 6 in conjunction with FIG. 1, there is shown a cross section of the midsole 22 manufactured according to the preferred embodiment. The midsole 22 has an outer border portion or wrap 32 preferably composed of a closed cell foam material such as ethylene vinyl acetate (EVA). It is preferable that the outer surface 34 of the midsole 22 be composed of a closed cell foam, because closed cell foam materials are structurally formed of a closed network of cells without interstices therebetween. Consequently, closed cell foams are water resistant.

The midsole 22 also has an inner core portion 36 preferably composed of an open cell foam material such as polyurethane (PU). Open cell foam materials are structurally formed of an open network of cells similar to a sponge. Thus, if provided on the outer surface 34 of the midsole 22, open cell foam materials might undesirably absorb water.

A preferred wrap 32 has an outer peripheral surface 38 forming at least a portion of the outer surface 34 of the midsole 22. For example, the plurality of horizontal ornamental features 26 provided on the wrap 32, as best seen in FIG. 1, comprise at least a portion of the outer surface 34 of the midsole 22. While the wrap 32 of FIG. 6 is shown to have its entire outer peripheral surface 38 comprising the outer surface 34 of the midsole 22, the wrap 32 could be situated on the midsole 22 such that is has only a portion of its outer surface 38 exposed on the outer surface 34 of the midsole 22. Under such a midsole construction, the other portions of the wrap's outer surface 38 would be covered beneath the outer surface 34 of the midsole 22. The wrap also has an inner peripheral surface 40 which is in at least partial contact with the core 36. An adhesive is preferably provided on the inner peripheral surface 40 of the wrap 32.

The plastic materials comprising the wrap 32 and the core 36 are preferably materials exhibiting different densities. For example, the wrap 32 can be made of ethylene vinyl acetate (EVA) while the core 36 can be made of polyurethane (PU). A wrap 32 manufactured of EVA could have a density, for example, between 0.10 gm/cc and 0.40 gm/cc (ASTM D297), preferably between 0.15 and 0.25 gm/cc. A core 36 manufactured of P U could have a density, for example, between 0.15 g/cc and 0.40 gm/cc (ASTM D297), preferably between 0.22 g/cc and 0.28 g/cc. Moreover, the two plastic materials comprising the midsole are preferably materials exhibiting different hardnesses. A wrap 32 manufactured of EVA could have a hardness, for example, between 35 Asker C and 90 Asker C (ASTM D2240), preferably between 55 Asker C and 70 Asker C. A core 36 manufactured of PU could have a hardness, for example, between 40 Asker C and 65 Asker C (ASTM D2240), preferably between 45 Asker C and 55 Asker C. The foamed polyurethane can be such as that produced by Kao Seiken of Japan, Iso B2009 DW, polyol 608U.

Figure 3:
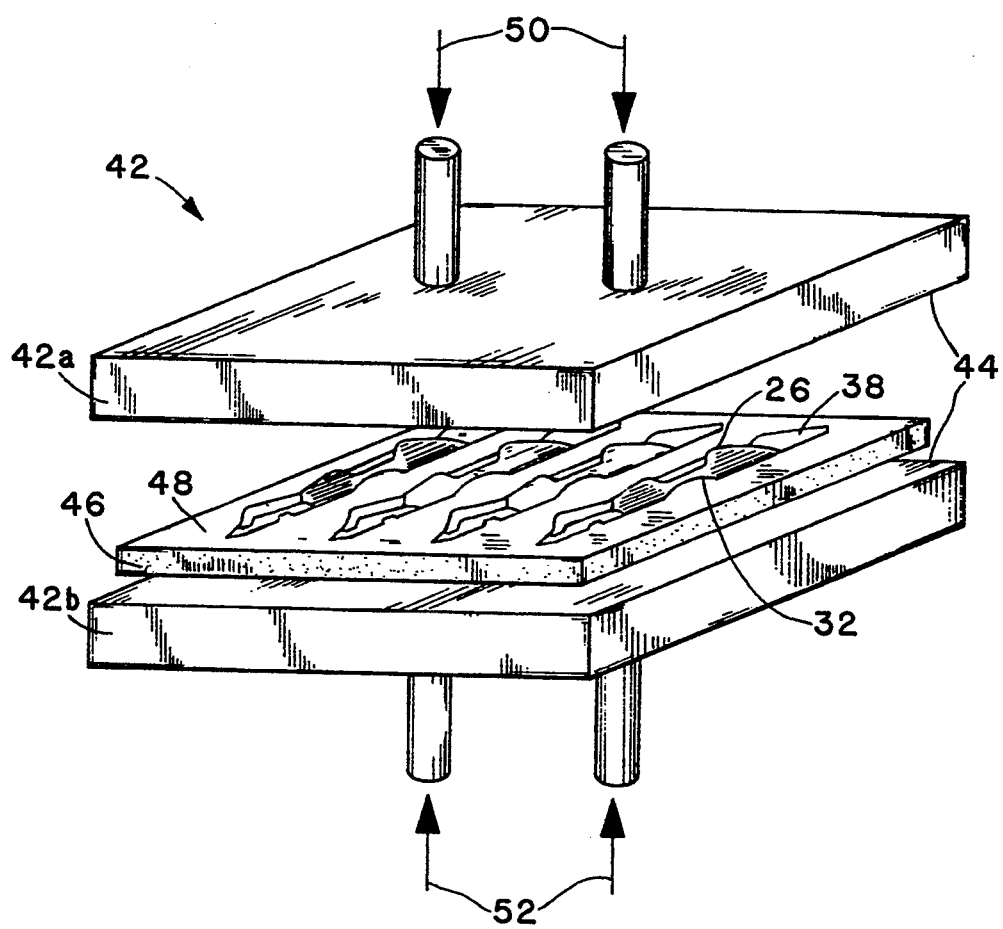
FIG. 3 is a perspective view of the mold used to manufacture the peripheral wrap according to the preferred method.

With reference to FIG. 3, there is shown a schematic of the parts used in the process of molding the wrap 32. A first mold 42 is comprised of two halves 42a, 42b. Each mold half 42a, 42b has a plurality of contours on the surface 44 thereof capable of simultaneously molding a plurality of wraps 32. The first half 42a of the mold 42 has contours on its surface 44 which are similar to the final shape on the outer surface 38 of the wrap 32. For example, the contours molded on the wrap 32 might include the horizontal lines 26 seen also in FIGS. 1 and 4. The horizontal lines 26 are just one example of a variety of ornamental features that can be provided on the outer surface 34 of the midsole 22. The outer surface 38 of the wrap 32 which is molded by the first half 42a of the first mold 42 will eventually face outwardly when disposed on the midsole 22. However, as explained above, the wrap produced by the first mold half 42a might only be partially exposed on the outer surface 34 of the midsole 22.

The second half 42b of the first mold 42 has contours which are similar to the final shape of the interior surface 40 of the wrap 32. Thus, the inner surface 40 of the wrap 32 which is contoured by the second half 42b of the first mold 42 will face inwardly when disposed on the midsole 22. The part of the wrap 32 facing inwardly eventually comes in at least partial contact with the core 36.

The molding process of the wrap 32 can be accomplished preferably by one of two methods, both of which can be explained with reference to FIG. 3. Under the first method, a flat sheet stock 46 consisting of well known materials such as EVA foam is manufactured according to processes well known to those skilled in the art. The sheet stock 46 is then placed in a conveyorized oven and heated via forced air convection to a surface temperature between 120° C. and 150° C., preferably between 130° C. and 140° C. Alternatively, preforms approximating the shape of the wrap 32 can be die cut from the sheet stock 46, and heated via forced air convection to a surface temperature between 120° C. and 150° C., preferably between 130° C. and 140° C. Next, the heated sheet stock 46, or alternatively, the heated preforms are located between the mold halves 42a, 42b which have been chilled to a temperature between 10° C. and 30° C., preferably between 15° C. and 20° C. The mold halves 42a, 42b are then forced toward the surface of the sheet stock 46. The direction of force is aligned substantially perpendicular to the outer surface 48 of the sheet stock 46, for example in the direction of arrows 50, 52. In other words, pressure is applied to the outer surface 48 of the sheet stock 46 or the preforms in a direction which is substantially perpendicular to the outer surface 48 of the sheet stock 46.

Since the mold halves 42a, 42b are chilled, the process of sandwiching the sheet stock 46 simultaneously quenches the sheet stock 46 or the preforms and forms imprints of the wraps 32 thereon. After about ½ to 2 minutes, the mold halves 42a, 42b are removed from the sheet stock 46. Consequently, a plurality of imprints of peripheral wraps 32 are formed in the sheet stock 46 or the preforms. The wraps, 32 may then be die cut from the sheet stock 46 and have subsequent cutting steps done thereto such as the addition of oval windows 28 as seen in FIGS. 1 and 4.

A second preferred method of manufacturing the wrap 32 is similar to the first, method insofar as first producing a sheet stock 46 of EVA or some equivalent plastic material. As in the first method, mold halves 42a, 42b apply pressure to the outer surface 48 of the sheet stock 46 in a direction which is substantially perpendicular to the outer surface 48 of the sheet stock 46, or, in other words, the mold halves 42a, 42b are moved in a direction which is substantially perpendicular to the outer surface 48 of the sheet stock 46. For example, the pressure is applied in the direction of arrows 50, 52. However, under the second preferred manufacturing method, the sheet stock 46 is not preheated in a conveyorized oven. Instead, while at room temperature, preformed shapes approximating the final shape of the wrap 32 are die cut from the sheet stock 46. Alternatively, under the second preferred method, the step of using a preform could be substituted, and instead, the sheet stock 46 could be used.

The mold halves 42a, 42b are then brought to a controlled temperature of less than 30° C. Next, the preformed strips or the sheet stock 46 are placed between the mold halves 42a, 42b which are brought to a clamping pressure between 80 kg per square cm and 120 kg per square cm, preferably about 100 kg per square cm. The mold halves 42a, 42b have contoured surfaces 44 of the same shape as the outer 38 and inner 40 surfaces of the completed wrap 32. While clamped, the mold halves 42a, 42b are heated to a temperature between 120° C. and 150° C., preferably between 130° C. and 140° C., for three to seven minutes, preferably about five minutes. While still maintaining the aforementioned pressure between the mold halves 42a, 42b, the mold halves 42a, 42b are then chilled to a temperature between 10° C. and 30° C., preferably between 15° C. and 20° C. The chilling time in the mold is between five minutes and fifteen minutes, preferably about ten minutes. Finally, the mold halves 42a, 42b are separated, and the wrap 32 is trimmed of flash, or alternatively, the wrap 32 is die cut from the sheet stock 46. The cycle time for the second method of manufacturing the wrap 32 is longer than the first method.

Figure 4:
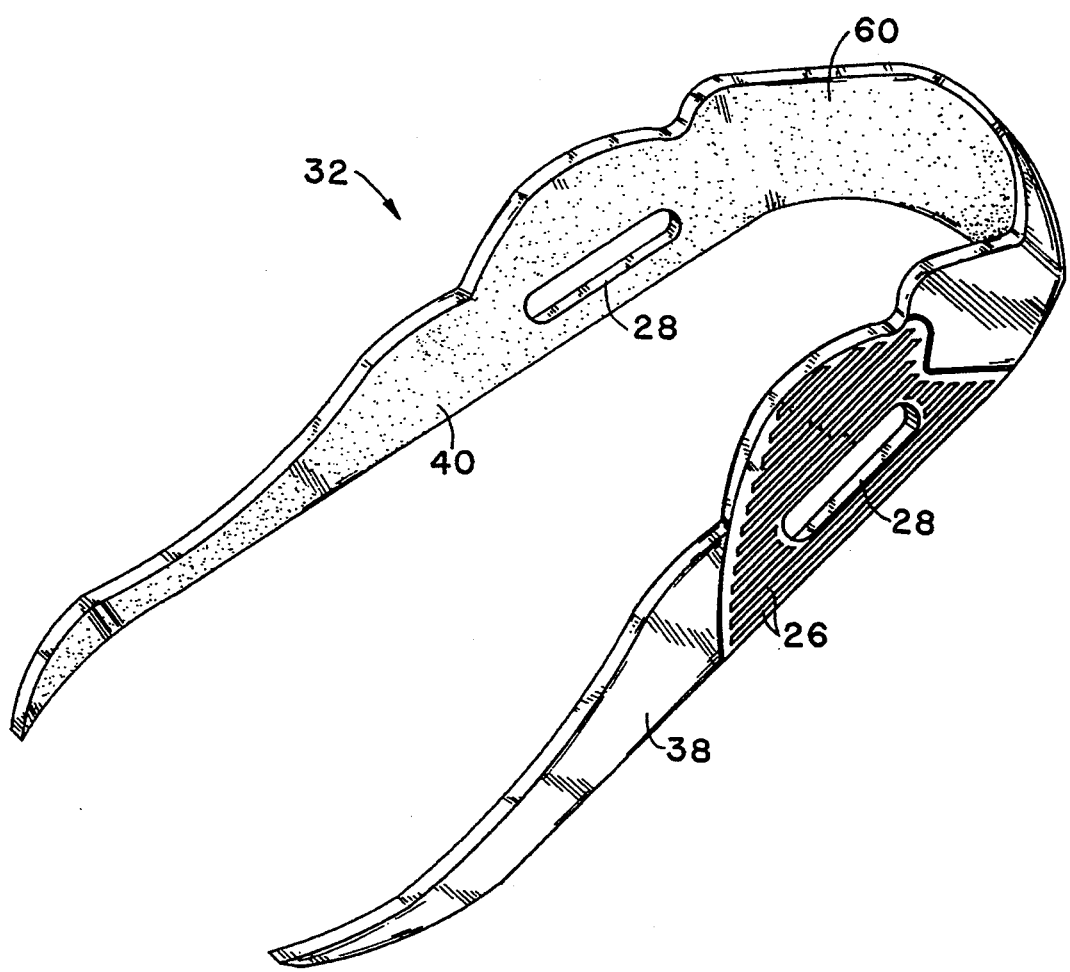
FIG. 4 is a perspective view of the peripheral wrap manufactured according to the preferred method.

After being die cut from the sheet stock 46, a wrap 32 manufactured according to the first or second methods appears as seen for example in FIG. 4. Other ornamentation such as the oval windows 28 can be added along the length of the wrap 32 either during or after the die cutting process.

Figure 5:
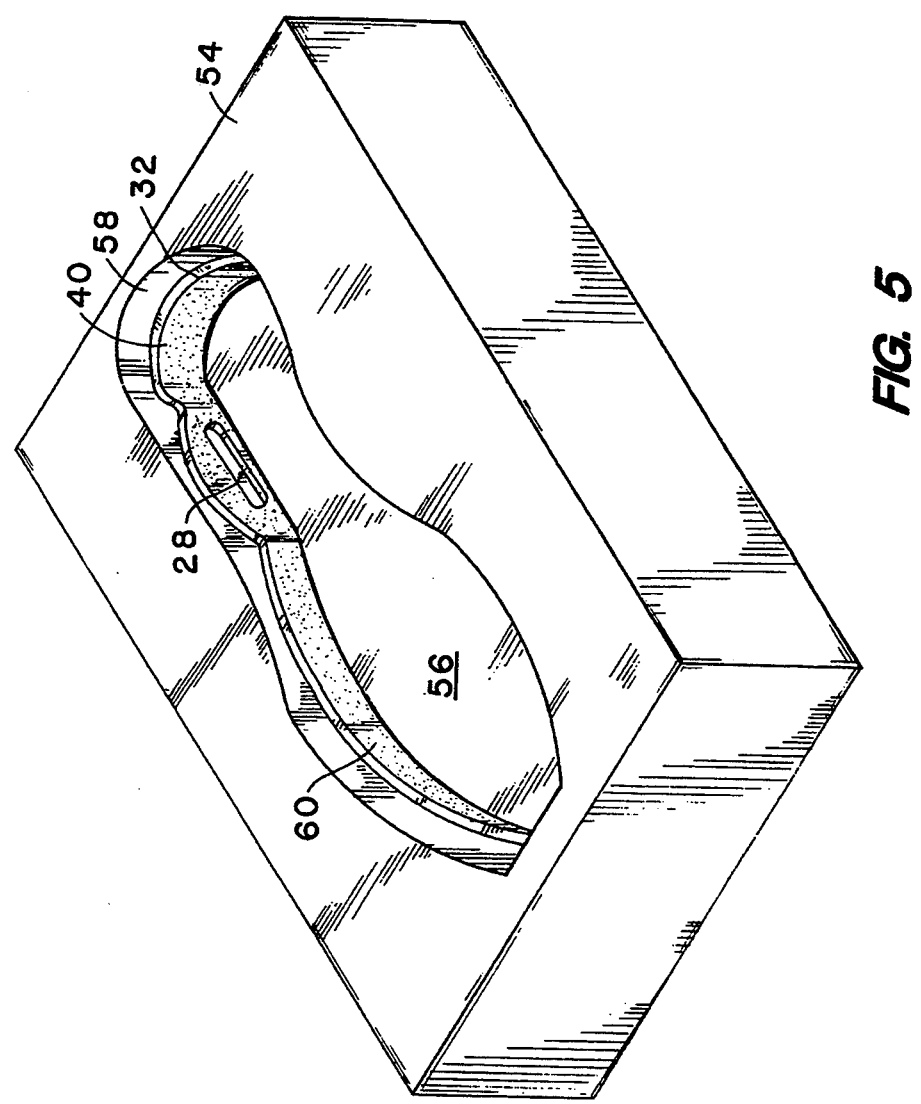
FIG. 5 is a perspective view of the wrap placed within a mold used to form the unitary midsole.

With reference to FIG. 5, there is shown a schematic representation of a second mold 54 used to make the midsole in accordance with the present invention. The second mold 54 has a cut-out portion 56 of substantially the same final shape as the completed midsole 22. The cut-out portion 56 has vertically extending sidewalls forming an inner peripheral surface 58 of the second mold 54. A wrap 32 manufactured according to the present invention is primed, and an adhesive 60 is applied to the inner surface 40 of the wrap 32 to enhance the bonding of the wrap 32 with the core 36. Then the wrap 32 is placed along at least a portion of the inner peripheral surface 58 of the second mold 54 as shown in FIG. 5. At this time, other elements can also be positioned in their proper relative orientation in the second mold 54. For example, an air bag insert may be placed within the second mold 54 in alignment with the oval windows 28.

Once the necessary elements have been placed within the second mold 54, the midsole 22 can be molded as a complete unit. First, a plastic material such as thermoset elastomeric polyurethane (PU) is poured into the second mold 54 while the second mold 54 is open. The second mold 54 is then clamped shut and preheated to a temperature between 45° C. and 65° C., preferably between 50° C. and 55° C. The second mold 54 remains clamped shut for a dwell time between eight minutes and sixteen minutes, preferably about twelve minutes. Thus, the thermoset plastic material is allowed to solidify in situ after being poured. The second mold 54 is then opened, and a unitary midsole 22 having a wrap 32 of a second plastic material and a core portion 36 of a first plastic material is obtained.

Under the preferred methods of manufacturing a midsole 22, the pressure that was applied to the wrap 32 during the molding process will have been changed with respect to the prior art. In particular, all of the compressive forces that produced the contoured outer surface 38 on the wrap 32 were directed substantially perpendicular with respect to the outer surface 34 of the midsole 22. Consequently, the outer surface 38 of the wrap 32 exposed as the midsole sidewall can obtain more defined design details than that obtainable on a midsole manufactured according to the prior construction methods. This is because prior midsole construction methods apply molding pressures only in a direction which are substantially parallel to the outer surface 34 of the midsole 22. Since the midsole 22 manufactured according to the preferred methods had no vertically directed pressures applied to the second mold 54 after the core 36 had been poured therein, the wrap 32 maintains all of the ornamental design characteristics acquired during the compression molding stage in the first mold 42.

Thus, the preferred methods apply molding pressures on the wrap 32 in a direction which is substantially perpendicular with respect to the outer surface of the midsole. For example, with reference to FIG. 6, the pressure applied to the outer surface 34 of the midsole 22 has been in a direction that is substantially perpendicular to the outer surface 34. The direction of the compressive forces according to the preferred methods are aligned as shown for example by arrows 62. The prior midsole construction methods could not obtain sharp ornamental definition along the outer surface 34 of the midsole 22, because the prior midsole construction methods applied compressive forces which were substantially parallel with the outer surface 34 of the midsole 22.

By incorporating a separate molding step which applies perpendicular forces with respect to the ornamental design on the wrap 32, this method eliminates the vertical compressive forces of the prior art. It was these vertical compressive forces of the prior art molding technique that made it difficult to obtain detailed designs on the outer surface 34 of the midsole 22. Moreover, it is now conceivable under the instant invention to provide a midsole 22 having sidewalls that extend to the top of the collar of the shoe. This would be desirable where increased lateral stability was needed.

In addition to the aesthetic advantages afforded by the midsole 22 manufactured according to the preferred methods, the structure of the wrap 32 also provides varying degrees of lateral support along the length thereof. In particular, as the wrap 32 is compressed by the first mold 42, it is constructed with different densities and hardnesses along the length thereof. Thus, by controlling the placement of localized densities and hardnesses along the wrap 32, the lateral stability can be more closely controlled. Accordingly, the midsole 22 can be finely tuned to provide varying degrees of lateral stability along the length of the wrap 32. In other words, it is possible to achieve varying degrees of lateral support around the shoe.

It is also within the purview of the preferred methods to manufacture the ornamental details on the outer surface 34 of the midsole 22 by using a mold that compresses on the outer surface 34 of the midsole 22 in a direction aligned substantially perpendicular therewith. In other words, the midsole 22 would be placed in a mold, and instead of applying vertical pressures to the top of the midsole 22 as in the prior art, horizontal pressures would be applied to the outer surface 34 of the midsole 22 in a direction such as that shown by the arrows 62 in FIG. 6. Accordingly, detailed ornamental features would be obtained, because the direction of the compressive forces would be perpendicular with respect to the outer surface 34 of the midsole 22.

All of the U.S. Patents mentioned in the Background of the Invention are hereby incorporated by reference.

This invention has been described in detail with respect to the preferred embodiments. These embodiments, however, are merely for example only and this invention is not intended to be restricted thereto. It will be easily understood by those skilled in the art that variations and modifications can be easily made within the scope of the invention, as defined by the appended claims.

We claim:

1. A method of manufacturing a peripheral wrap element for a shoe midsole to be secured to a shoe outsole, the wrap formed from a plastic closed cell foam material, the wrap having an outer surface comprising at least a portion of an outer peripheral surface of said midsole, the wrap being separate from said outsole, said method comprising the steps of:
    placing a sheet stock of plastic closed cell foam material having an inner and an outer surface into a mold; and
    compressing said sheet stock with the mold by moving said mold in a direction aligned substantially perpendicular to said outer surface of said sheet stock to form a contoured outer surface on said sheet stock, wherein said contoured outer surface of said sheet stock comprises said outer surface of said wrap, wherein said contoured outer surface of said wrap comprises at least a portion of said outer peripheral surface of said midsole and is separate from said outsole, and wherein an inner surface of said wrap which is opposite said contoured outer surface of said wrap engages said mold during compression of said sheet stock.

2. A method of manufacturing a peripheral wrap for a shoe midsole to be attached to a shoe outsole, the wrap composed of a plastic closed cell foam material, the wrap having a contoured outer surface comprising at least a portion of an outer peripheral surface of the midsole and an inner surface to be placed in contact with the peripheral surface of a core portion of the midsole, the wrap being separate from said outsole, said method comprising the steps of:
    placing a sheet stock of plastic closed cell foam material to form the peripheral wrap into a mold having opposing first and second surfaces;
    contacting one surface of the plastic closed cell foam material with the first surface of the mold;
    contacting the opposite surface of the plastic closed cell foam material with the second surface of the mold; and
    forming the contoured outer surface of the wrap on the one surface of the plastic closed cell foam material by moving the first and second surfaces of the mold toward one another to compress the plastic closed cell foam material between the first and second surfaces of the mold whereby the compressive forces producing the contoured outer surface of the wrap are directed substantially perpendicular with respect to the peripheral surface of the core portion of the midsole.

3. A method of manufacturing a peripheral wrap element for a shoe midsole to be secured to a shoe outsole, the wrap formed from a plastic closed cell foam material, the wrap having an outer surface comprising at least a portion of an outer peripheral surface of said midsole, the wrap being separate from said outsole, said method comprising the steps of:

placing a sheet stock of plastic closed cell foam material to form said peripheral wrap into a mold; and compressing said plastic closed cell foam material with said mold to form a contoured outer surface of said wrap, wherein said contoured outer surface of said wrap comprises at least a portion of said outer peripheral surface of said midsole and is separate from said outsole, and wherein when said wrap is placed on said midsole, the compressive forces producing said contoured outer surface of said wrap have been directed substantially perpendicular with respect to said outer peripheral surface of said midsole.

* * * * *